United States Patent
Gendron et al.

[15] 3,658,194
[45] Apr. 28, 1972

[54] GRAVITY TYPE PAN UNSTACKER

[72] Inventors: Roger J. Gendron, Bridgeport; Dewitt Sims, Burt, both of Mich.

[73] Assignee: Baker Perkins, Inc., Saginaw, Mich.

[22] Filed: May 11, 1970

[21] Appl. No.: 36,314

[52] U.S. Cl. .......................................... 214/8.5 K, 221/77
[51] Int. Cl. ..................................................... B65g 59/06
[58] Field of Search ................ 214/8.5 A, 8.5 K; 221/77, 78

[56] References Cited

UNITED STATES PATENTS

| | | | |
|---|---|---|---|
| 3,477,592 | 11/1969 | Kuhlman | 214/8.5 A |
| 2,695,125 | 11/1954 | Bowen | 214/8.5 K |

*Primary Examiner*—Gerald M. Forlenza
*Assistant Examiner*—George F. Abraham
*Attorney*—Learman & McCulloch

[57] ABSTRACT

Apparatus for successively unstacking the lowermost panset from a vertically extending stack of pansets wherein vertically extending, opposed, endless lowerator conveyors comprising opposed resilient blocks are relatively horizontally movable between a relatively more spread stack receiving position, to receive a stack of pansets, and a more closed stack clamping position to grip a stack of pansets. A reciprocably movable, track mounted carriage is provided for successively moving vertically extending stacks to a position between the opposed conveyors when the conveyors are in the stack receiving position, and a conveyor drive system is provided to move the conveyors downwardly when they are in the stack clamping position to move the stack downwardly and successively release the lowermost pan at the lever where the conveyor diverge at the lower ends of the conveyor runs. A horizontally movable discharge conveyor is positioned below the opposed conveyors in centered position to successively receive the unstacked pans and convey them to another location for further processing.

12 Claims, 9 Drawing Figures

INVENTORS
ROGER J. GENDRON
DEWITT SIMS
BY Learman & McCulloch
ATTORNEYS

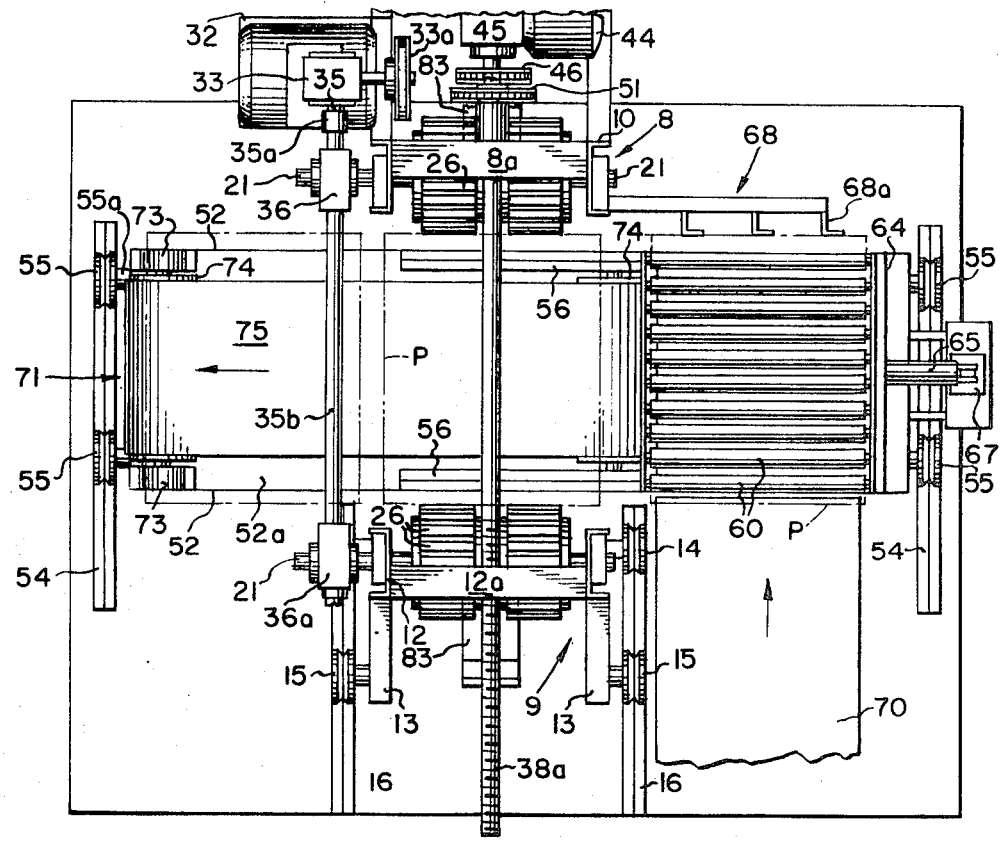
FIG. 3
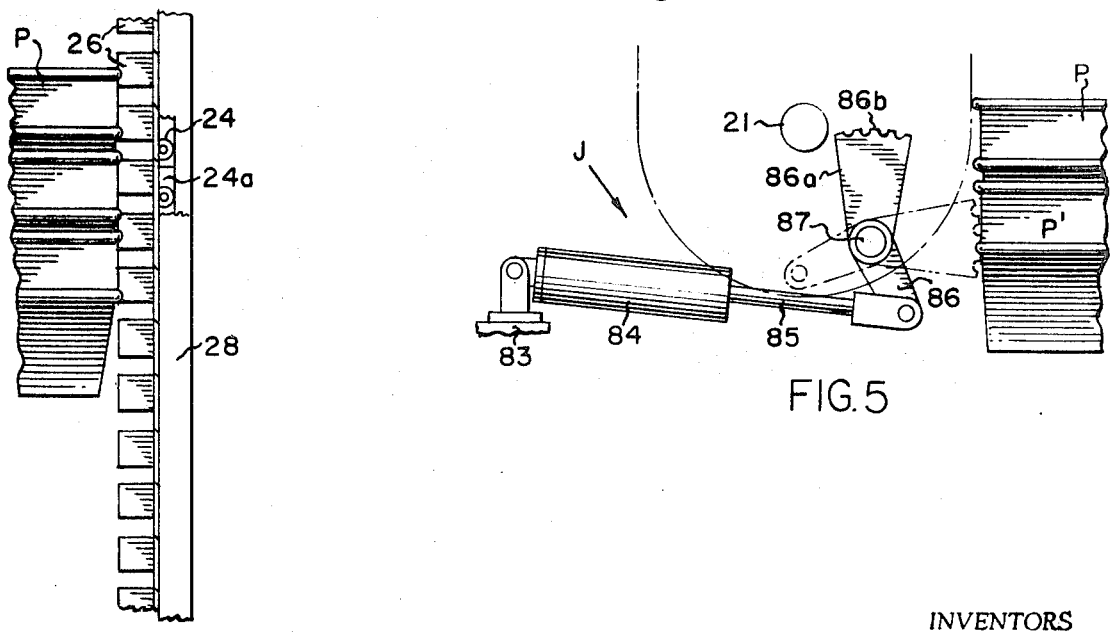
FIG. 4
FIG. 5
INVENTORS
ROGER J. GENDRON
DEWITT SIMS
BY Learman & McCulloch
ATTORNEYS

GRAVITY TYPE PAN UNSTACKER

This invention relates to pan or panset unstacking apparatus for use in baking and like operations. In large scale bakery operations, the pans or pansets in which bread is baked are normally stored in stacks when not in use. When the pans are required, they must be quickly unstacked, and the maximum delivery rate of known prior art unstacking apparatus is lower than that required by the newer systems. One of the prime objects of the present invention is accordingly to provide a very rapidly operating and yet reliable unstacker which is capable of use without slowing production lines in the more contemporary baking systems.

It is also common practice in bakeries to utilize pans of differing size depending upon the demand on a particular day for certain products. Accordingly, there is a need for unstacking mechanism which will readily adapt to the varying size pans and pansets without the need for coordinating or synchronizing the outputs from two or more individual unstackers which will unstack pansets of one size only. If individual unstackers must be provided for each varying size panset, the multiplicity of unstacking mechanism will result in a high-cost inventory of such machinery.

When pansets are nested in a stack, those which become slightly cocked in the stack frequently stick and will not separate. It is another object of the present invention to provide high-speed pan unstacking apparatus with net delivery rates in excess of the rates achievable with presently existing machines which release the pansets in such manner as not to cause cocking thereof.

It is still another object of the present invention to provide pan unstacking mechanism which is operable to successively unstack pans from stacks that are of varying widths.

It is a further object of the present invention to provide apparatus for unstacking a stack of pans by successively releasing the lowermost pan and for denesting a released pan which remains inadvertently nested with a superjacent pan for a predetermined time after release.

Briefly, in accordance with the invention, there is provided apparatus for successively unstacking the lowermost pan from a vertically extending stack of pans comprising: opposed lowerator conveyor means which are relatively laterally movable between a stack receiving and a stack clamping position in which they support a stack of pans. The conveyor means progressively lower the stack and successively release the lowermost pan.

Other objects and advantages of the present invention will be pointed out specifically or will become apparent from the following description when it is considered in conjunction with the appended claims and accompanying drawings in which:

FIG. 3 is a top plan view taken along the line 3 — 3 of FIG. 1;

FIG. 4 is an enlarged fragmentary, elevational view illustrating the construction of the unstacking belts;

FIG. 5 is an enlarged fragmentary front elevational view, taken along the line 5 — 5 of FIG. 1, and illustrating jogging apparatus for denesting a released pan which inadvertently remains nested with a superjacent pan;

Figure 1:
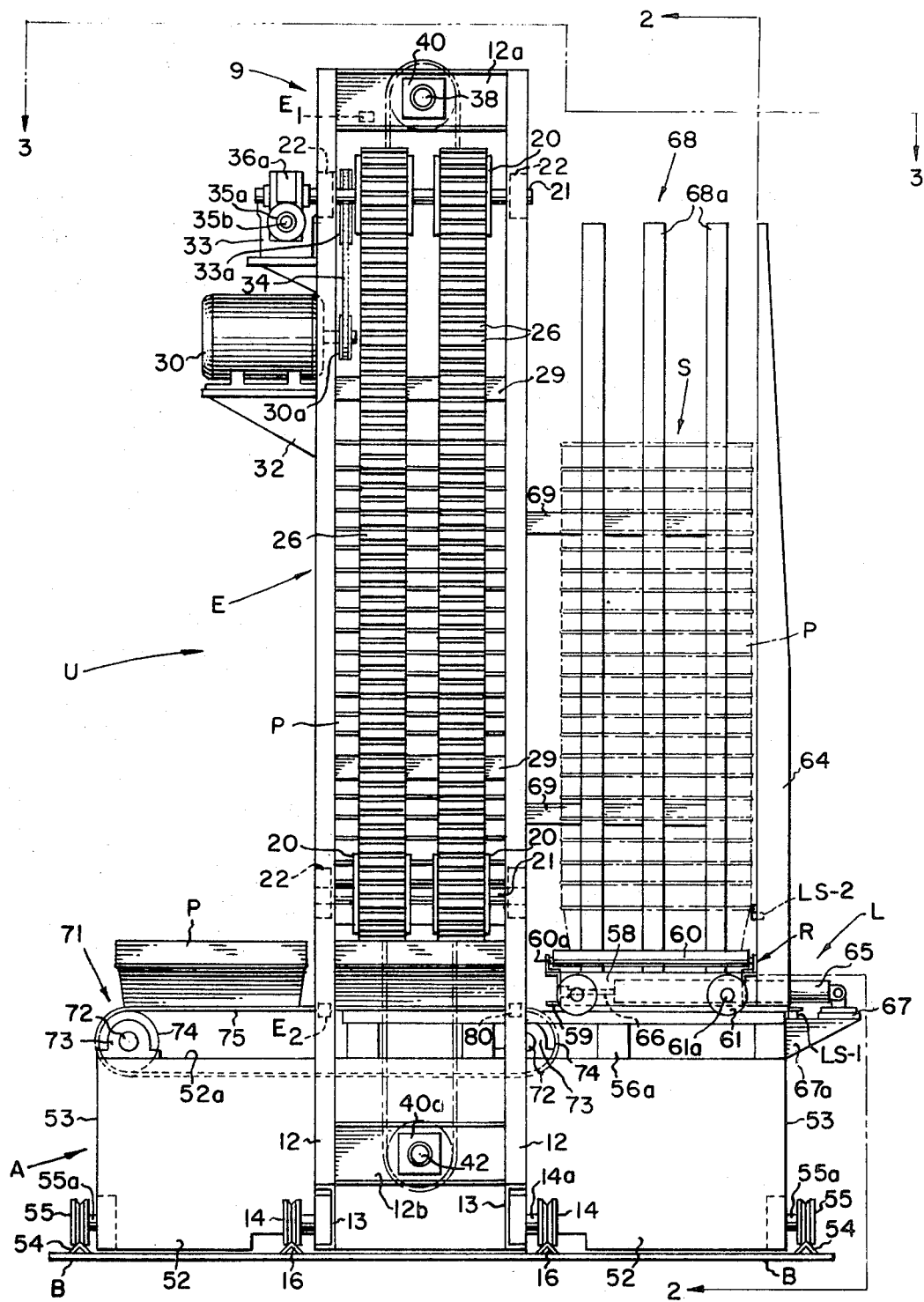
FIG. 1 is a side elevational view illustrating unstacking apparatus according to the invention with a stack of pansets schematically illustrated in position for unstacking and another stack of pansets schematically illustrated in a ready position waiting to be moved between the unstacking belts.

Referring now more particularly to the accompanying drawings, wherein a preferred embodiment of the invention is illustrated, unstacking mechanism, generally designated U, is mounted on a base B and includes a fixed frame 8 and a movable frame 9. The frame 8 comprises a pair of vertically extending channel members 10 fixed at their lower ends to the base B and connected by upper and lower spanning members 8a and 8b. The frame 9 comprises a pair of channel frame members 12 connected by upper and lower spanning members 12a and 12b, and is movably supported on the base B on grooved wheels 14, which are journaled on pins 14a mounted on the channel members 12. The wheels 14 ride on a set of inverted V-shaped tracks 16 fixed to the base B. Horizontally extending channel members 13 are fixed to the bases of the channel members 12 and mount similar grooved wheels 15 which ride on the tracks 16 and serve to stabilize the movable frame 9.

Figure 2:
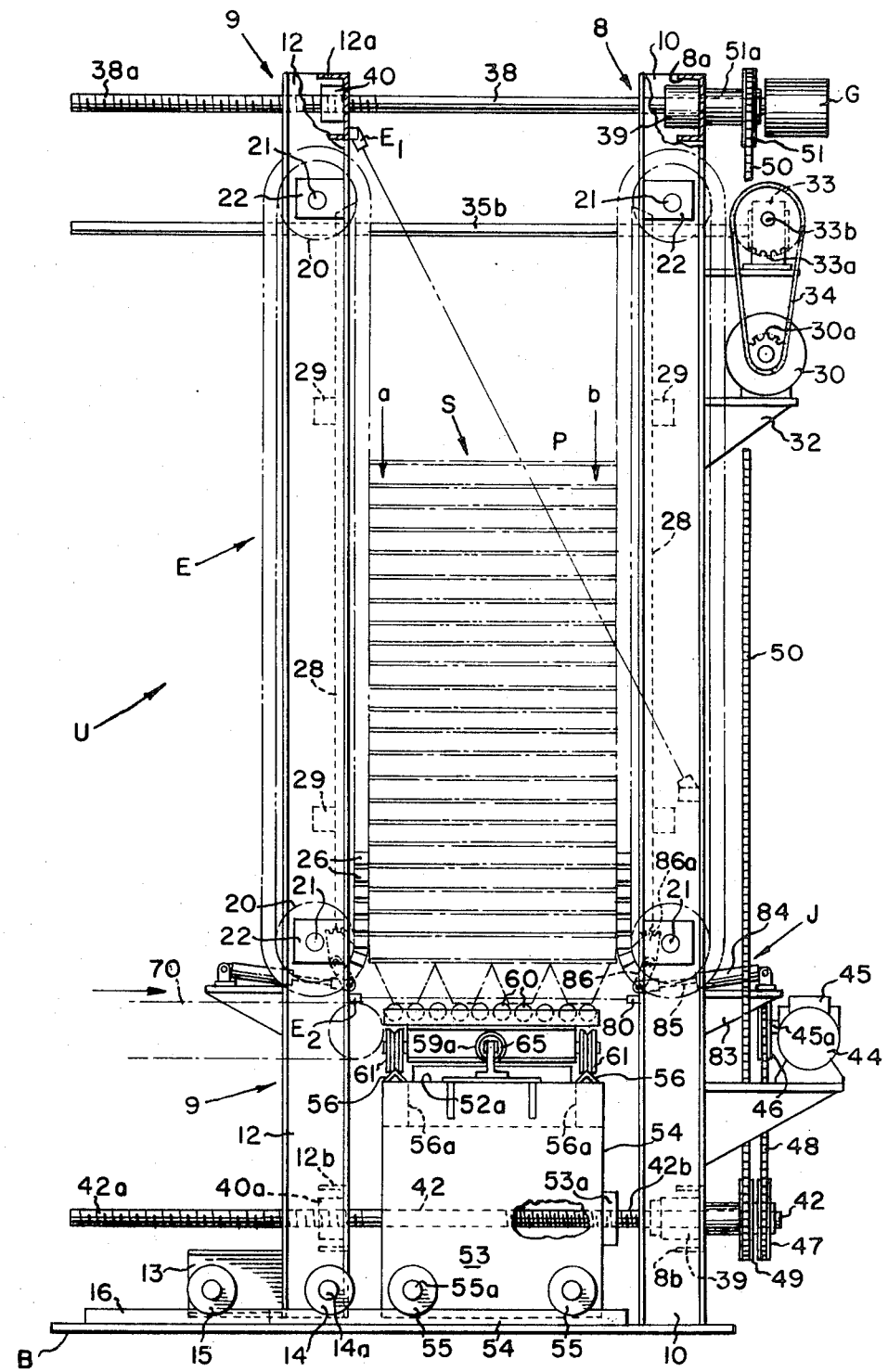
FIG. 2 is a fragmentary, partly sectional front elevational view taken along the line 2 — 2 of FIG. 1.

The fixed and movable frames 8 and 9 mount pairs of vertically disposed endless conveyor members E for gripping and supporting a stack S of individual pansets P in an upright position therebetween, as illustrated in FIG. 2. The endless members E are trained around pairs of vertically spaced upper and lower sprockets 20, fixed on shafts 21, journaled in suitable bearing blocks 22, which are fixed to the members 10 and 12. The endless members E may comprise flat-top endless chains 24 mounting a plurality of precisely uniformly spaced apart resilient rubber blocks 26, in the range 30 – 50 Shore A, to the outer face of the individual flat top chain links 24a in any suitable manner, such as with screws or an adhesive. A plurality of chain back-up rail members 28 are provided along the inner runs of endless members E and are mounted on pairs of vertically spaced support members 29 spanning the channel-shaped frame members 10 and 12. A plurality of strips (not shown) which can suitably be formed of "Formica," may also be mounted on the back-up support members 29 to provide long wearing guide surfaces. As the endless members E are respectively driven clockwisely and counterclockwisely in the direction of the arrows a and b, respectively, in FIG. 2 the stack S of pansets P will be lowered to sequentially release the lowermost panset at the point where the opposite members E diverge at the lower ends thereof.

For driving the endless members E, a motor 30, supported on a platform 32 fixed to the frame member 10, mounts a drive sheave 30a which is connected with a sheave 33a on the input shaft 33b of a gear reduction unit 33 by a belt 34. The gear reduction unit 33 drives an output shaft 35 (FIG. 3) coupled as at 35a to a drive shaft 35b which mounts a pair of right angle power transmission units 36 and 36a constructed to drive the upper shafts 21 on the fixed and movable frames 8 and 9 in opposite directions of rotation. The unit 36a and the shaft 35b are complementally splined to permit the unit 36a to move with the movable frame 9 and slide along the shaft 35b while being maintained in driving engagement therewith.

To periodically move the movable frame 9 between the stack-clamping position shown in FIG. 2 and a removed position for receiving a new stack, upper and lower shafts 38 and 42 are each journaled at one end in suitable bearings 39 fixed to the cross-members 8a and 8b. The shafts 38 and 42 are threaded adjacent their other ends as at 38a and 42a to receive nuts 40 and 40a fixed to the cross-members 12a and 12b respectively on the movable frame 9.

Apparatus for driving the shafts 38 and 42 includes a motor 44 having its output shaft connected with the input shaft of a suitable gear reduction mechanism 45. The output shaft 45a of the gear reduction mechanism 45 drives a sprocket 46 which is connected with a sprocket 47, fixed to the shaft 42, by a chain 48, trained therearound. A chain 50, trained around a sprocket 49 fixed to the shaft 42 and a drive sprocket 51 fixed to the shaft 38, synchronizes the rotational movement of the shafts 38 and 42 which move the movable frame 9 outwardly and inwardly depending upon the direction of rotation thereof. A spacer 51a journaled on the shaft 38 maintains the sprocket 51 in alignment with the sprocket 49. When the movable frame 9 is moved outwardly in FIG. 2, the unstacking machine is conditioned to receive a stack of pansets and when the movable frame 9 is moved inwardly to the position illustrated in FIG. 2, the frames 8 and 9 will clamp a stack of pansets P therebetween.

For loading the stacks S of pansets P between the pairs of endless members E of the pan unstacking mechanism U, a reciprocable loader carriage, generally designated L, is provided. The carriage L is mounted on a box-like frame A formed of side plates 52 (FIG. 3) and end plates 53 and is movably mounted on a set of inverted V-shaped tracks 54, which are fixed to the base B outwardly of the tracks 16. Grooved wheels 55, supported on suitable spindles 55a extending from the end walls 53, support the frame A. The top wall 52a of the frame A mounts a pair of inverted V-shaped tracks 56 (FIGS. 2 and 3) on blocks 56a (FIG. 1).

The carriage L, which rides on tracks 56, includes a rectangular frame R having channel-shaped side members 58 connected at their ends by channel-shaped end members 59 in any suitable manner such as by welding. The frame R supports a plurality of freely rotatable rollers 60, with ends 60a journaled by the end frame members 59, which collectively provide support for a stack S of pans or pansets P to be loaded into the unstacking apparatus U. Pairs of grooved rollers 61 are mounted on axles 61a extending from the side frame members 58 for supporting the loader carriage L on the tracks 56. Extending upwardly from the right end of the loader carriage L in FIG. 1 is an upwardly extending pusher plate 64 which extends the width of the carriage L.

To move the loader carriage L from the position shown in FIG. 1 to a position between the pairs of endless members E, a double-acting, solenoid operated pneumatic cylinder 65 extends freely through an aperture 59a in one of the members 59 and includes a piston rod 66 connected with the other of the members 59. The cylinder 65 is mounted on a base 67 supported on gussets 67a secured to the one end plate 53 of the frame assembly A. As shown in FIGS. 1 and 3, fixed to the frame 8 in any suitable manner such as welding, is an upwardly extending stop frame 68 comprising a plurality of upwardly extending members 68a reinforced by cross-members 69 to halt the stack S as it is moved onto the loader carriage L by an endless belt conveyor 70.

For receiving the individual pansets P as they are released from the bottom of the stack, an endless belt conveyor, generally designated 71, is mounted atop the frame assembly A and includes a pair of longitudinally spaced shafts 72 which are journaled in bearing blocks 73 on top wall 52a and which mount a pair of belt drive rollers 74 having a belt 75 trained therearound in the normal manner. A suitable power source, such as an electric motor (not shown), is connected with one of the shafts 72 to continually drive the belt 74 to discharge the pans P continuously therefrom.

To keep the conveyor 71 centered between the pairs of unstacking conveyors E so that the center of gravity of the released pansets P will be along the longitudinal centerline of the conveyor 71, the one side wall 52 of the frame assembly A mounts a nut 53a which receives a second threaded portion 42b of the shaft 42. The portion 42b of the shaft 42 has twice as many threads per inch as the portion 42a and thus, as the shafts 38 and 42 are driven to move the movable frame 9 a predetermined distance, the frame A and conveyor 71 will be moved only one-half this distance, thereby maintaining the conveyor 71 centered between the pairs of unstacking conveyor members E.

For detecting the presence of a stack between the pairs of endless members E, a photoelectric eye $E_1$ is mounted on the cross-member 12a and includes a normally closed set of contacts $E_{1a}$ and a normally open set of contacts $E_{1b}$ (FIG. 6), which are opened and closed respectively when a light beam emanating from a source 78, mounted on the fixed frame 8, is interrupted.

A second photoelectric eye $E_2$ is mounted on the movable frame 9 adjacent the lower end of the endless members E thereon and includes a set of normally closed contacts $E_{2a}$ (FIG. 6) which are opened when the beam of light emanating from a source 80 on the opposite side of the unstacking apparatus on the fixed frame 8 is interrupted.

A limit switch schematically illustrated at LS-1, which is actuated by the carriage loader L, when it moves to the rear position, includes normally open sets of contacts LS-1a and LS-1c, and normally closed contacts LS-1b, which are closed and opened respectively when the loader L is in the rear position.

To indicate the presence of a stack on the loader L, a limit switch, schematically illustrated at LS-2 (FIG. 1), is mounted thereon and includes normally open contacts LS-2a and normally closed contacts LS-2b which are closed and opened respectively when the limit switch LS-2 is depressed by a stack of pansets.

As shown in FIG. 5, when the lowermost panset P' has been released by the lowermost resilient block members 26 of the endless members E and yet remains inadvertently nested with a superjacent container P, a jogging mechanism, indicated schematically in FIG. 2 and more particularly in FIG. 5, at J, is mounted on the fixed channel-shaped members 10 on a suitable cross-piece such as 83. The jogging mechanism at each side of the machine includes a solenoid actuated, spring returned, single acting pneumatic cylinder 84 mounted on the cross-piece 83 and having a piston rod 85 pivotally connected with one end of a crank arm 86 which is fixed to a shaft 87 journaled in suitable bearings (not shown) on the side frame members 10. Fixed to the shaft 87 are spaced apart pan engaging, jogging members 86a which include toothed portions 86b, adapted to engage the lower bead on the panstrap of a lowermost panset P' which does not drop due to gravity forces, when the members 86a are pivoted from the full line position shown in FIG. 5 to the dotted line position also shown in FIG. 5, and thus positively move such a lowermost panset P' downwardly relative to the stack S. A timer $T_2$ (FIG. 6) is also provided for a purpose to be later described and includes a set of normally closed contacts $T_{2a}$ and a set of normally open contacts $T_{2b}$, which are opened and closed respectively when the timer $T_2$ times out.

Figure 6:
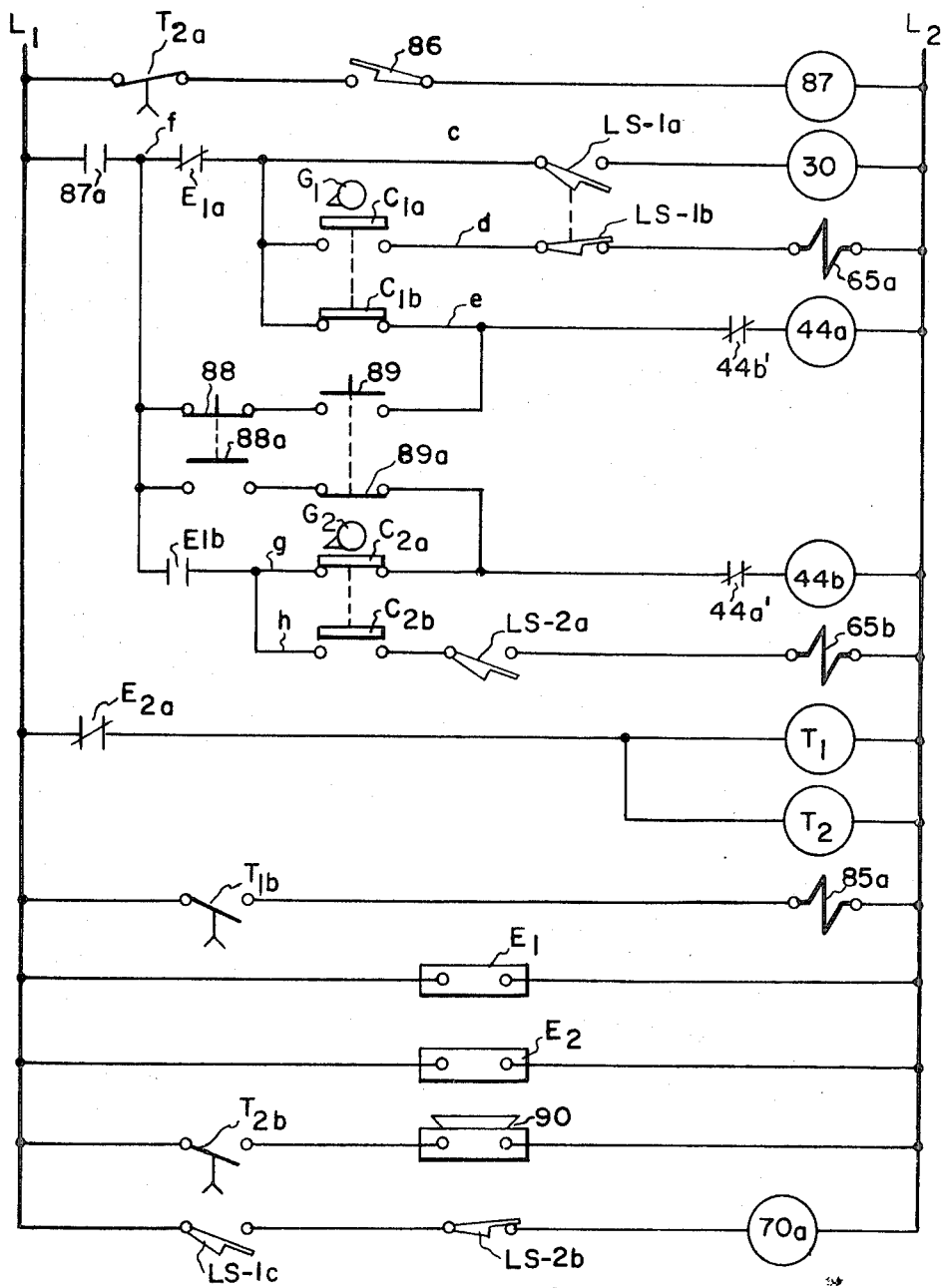
FIG. 6 is a schematic diagram of a typical electrical control circuit for controlling the operation of the apparatus disclosed in FIGS. 1 – 5.
Figure 7:
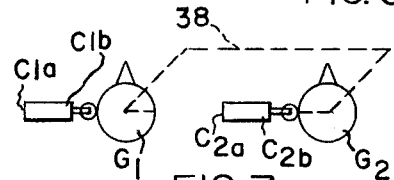
FIG. 7 is a diagrammatic illustration of the cam operated switches.

Referring now to the control circuit of FIG. 6, a suitable source of power, such as 110 volt 60 cycle alternating current, is connected across the lines $L_1$ and $L_2$. A holding relay 87 is connected across the source in series with the normally closed contacts $T_{2a}$ and a start switch 86. Connected in series across the lines $L_1$ and $L_2$ are the normally open relay contacts 87a, which close when the relay 87 is energized, the normally closed contacts $E_{1a}$, and a parallel circuit including three branches designated c, d, and e. Connected in series in line c are the normally open contacts LS-1a and the starting winding for the motor 30. Connected in series in line d are the normally closed contacts LS-1b, the retract solenoid 65a of cylinder 65 for moving the loader carriage L to the position shown in FIG. 1, and the normally open contacts $C_{1a}$ of a switch in a conventional "Gemco" cam operated switch box, diagrammatically illustrated at G, which includes cams $G_1$ and $G_2$ (FIG. 7), driven by the shaft 38 and operating switches $C_{1a}$, $C_{1b}$ and $C_{2a}$, $C_{2b}$ respectively in the usual fashion. The position of the switches $C_{1a}$, $C_{1b}$ and $C_{2a}$, $C_{2b}$ and the cams $G_1$ and $G_2$ are circumferentially adjustable relative to each other to control the time when the respective switches are actuated, for a purpose to be later described. Connected in series in line e are cam operated switch contacts $C_{1b}$, the normally closed contacts 44b', which are opened when the start winding 44b is energized, and one starting winding 44a for the reversible motor 44, which, when energized, starts the motor 44 rotating in one direction. Connected between the junction f of the contacts 87a and the contacts $E_{1a}$ is a series circuit including the normally open contacts $E_{1b}$ and a parallel circuit including lines g and h. Connected in series in the line g are the normally closed cam operated switch contacts $C_{2a}$, the normally closed contacts 44a' which are opened when the start winding 44a is energized, and a second start winding 44b, which when energized starts the motor 44 rotating in an opposite direction.

Connected in series in line $h$ are the normally open cam operated switch contacts $C_{2b}$, the normally open limit switch contacts LS–2a, and the forwarding solenoid 65b of cylinder 65 which when energized directs fluid into the cylinder 65 so as to extend the piston rod 66 to move the loader carriage L to a position between the chains of the unstacking mechanism U. Connected between the junction $f$ and the junction between contacts $C_{1b}$ and the contacts 44b' is a series circuit including manually operable, normally closed switch contacts 88 and the normally open contacts 89, which when manually moved to the closed position, energize the winding 44a. Similarly connected between the junction $f$ and the junction of the contacts $C_{2a}$ and the normally closed contacts 44a', is a series circuit including manually operable, normally closed contacts 89a and manually operable normally open contacts 88a which, when closed, energize the winding 44 b. The contacts 89a are ganged to the contacts 89 whereas the contacts 88a are ganged to the contacts 88.

Connected across the lines $L_1$ and $L_2$ are the normally closed contacts $E_{2a}$ and a parallel circuit comprising timers $T_1$ and $T_2$. The timer $T_1$ includes normally open contacts $T_{1b}$ which close when the timer $T_1$ times out. The timer $T_2$ includes a set of normally closed contacts $T_{2a}$ and a set of normally open contacts $T_{2b}$ connected in series across the lines $L_1$ and $L_2$ with an audible alarm 90 and which close when the timer $T_2$ times out to sound the alarm 90. The conventional timers $T_1$ and $T_2$ may be of the type manufactured by the Eagle Manufacturing Company of Davenport, Iowa, under Model No. HD Series 30, and are adjustable to vary the times for timing out. The contacts $T_{1b}$ are connected in series across the source with the solenoid 85a which will direct fluid into the cylinder 84 so as to retract the piston rod 85 and move the toothed members 86a from the full line to the dotted line position. Also connected in series across the source $L_1$ and $L_2$ are the normally open contacts LS–1c, the normally closed contacts LS–2b, and the starting winding for the motor 70a which drives the in-feed conveyor 70.

In operation, assuming that the unstacking mechanism is empty and that the start button 86 has been depressed, with the loader L in the rear position, the contacts LS–1c will be closed and will drive the in-feed conveyor motor 70a and advance a stack S onto the loader L. The stack S will engage the limit switch LS–2 and open the contacts LS–2b, thereby stopping the motor 70a. Because there is no stack between the endless members E at this time, the beam emanating from the source 78 to the eye $E_1$ will be uninterrupted and the normally closed contacts $E_{1a}$ will be open. The normally open contacts $E_{1b}$ will be closed, and the circuit to the start winding 44b which drives the shafts 42 and 38 will be complete so that the movable frame 9 will have been driven to the left in FIG. 2 and the pairs of endless members E will be in spread apart stack receiving position.

Then, with the Gemco switch contacts $C_{2a}$ open and the switch contacts $C_{2b}$ closed to complete the circuit through the now closed contacts LS–2a to the solenoid 65b, the loader L is moved forwardly to position the stack between the pairs of endless members E. When the stack is so positioned, the beam to the electric eye $E_1$ is interrupted to open contacts $E_{1b}$ to deenergize the advance solenoid 65b of cylinder 65, and the contacts $E_{1a}$ are closed to initially complete the circuit through the contacts $C_{1b}$ to the reversing winding 44a of the motor 44 to drive the shafts 38 and 40 so as to move the endless members E on movable frame 9 to clamp the stack S against the endless members E on fixed frame 8. The cam operated switch contacts $C_{1b}$ are positioned relative to the cam which controls them to open and halt the movement of frame 9 toward frame 8 by deenergizing winding 44a and stopping motor 44. Simultaneously, the contacts $C_{1a}$ are closed to complete the circuit through the contacts LS–1b and the retract solenoid 65a of cylinder 65 which withdraws the carriage L from under the stack S to the position shown in FIG. 1. When the loader L reaches its rear position, the switch LS–1 is engaged and contacts LS–1b open to deenergize solenoid 65a. The contacts LS–1a are also closed to energize the start winding for the motor 30 and drive the pairs of endless members E in the opposite directions $a$ and $b$ so as to move the stack S downwardly. At the lower ends of conveyors E, the opposed runs of conveyors E diverge in passing around sprockets 20 and the lowermost panset P', in moving downwardly, is released to fall by gravity to the conveyor belt 75 which conveys it forwardly to discharge the unstacked panset. As each lowermost panset P' is released from engagement with the opposed resilient members 26, the light beam being received by the eye $E_2$ is interrupted to energize the timers $T_1$ and $T_2$. If the panset does not drop beyond the base within a first predetermined time, the timer $T_1$ will time out to actuate the contacts $T_{1b}$ and energize the jog solenoids 85a which move the toothed portions 86 into engagement with the strap bead of the panset P'. If, for some reason, the jog apparatus J does not clear the eye $E_2$ within a slightly greater predetermined time, the timer $T_2$ times out and the contacts $T_{2b}$ close to sound the alarm 90, and the contacts $T_{2a}$ open to shut down the entire system. Assuming that no shut-down occurs, when the stack between the endless members E has been completely unstacked, the eye $E_1$ will again become unblocked and the closed contacts $E_{1a}$ will open, and the normally open contacts $E_{1b}$ will close, to again repeat the cycle.

The blocks 26 are sufficiently deformable and the clamping is such that the blocks 26 are deformed (see FIG. 4) to receive the beads of the pan strap which unites the pans of a panset. This provides a mechanical lock between the blocks 26 and pansets so that the pansets P are each positively supported as they travel downwardly and are not supported solely by frictional contact. Because there are spaces between the horizontally aligned blocks 26 at each side of the stack the lowermost panset P' is released by the blocks 26 on each side at precisely the same time and there is little tendency for the lowermost panset P' to be tilted or cocked to the extent it will become wedged in the superjacent panset and will fail to drop.

If pansets of different width are to be used, the relative circumferential positions of the cams $G_1$ and $G_2$ relative to their respective switches $C_{1a}$, $C_{1b}$ and $C_{2a}$, $C_{2b}$ is changed accordingly to adjust the time when the switches open and close, thereby controlling the distance which the frame 9 is moved. Notwithstanding any such adjustments, the centered position of conveyor 71 is assured by virtue of the manner in which it is mounted.

Figure 8:
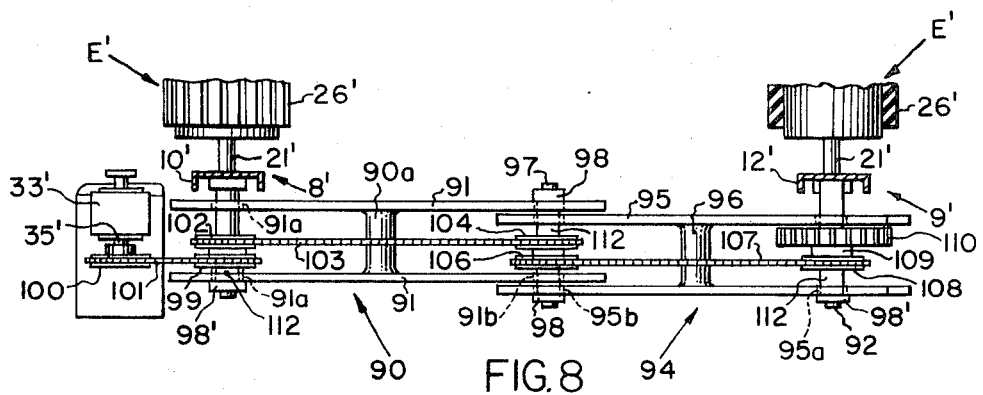
FIG. 8 is a fragmentary plan view illustrating alternative lowering conveyor driving mechanism.
Figure 9:
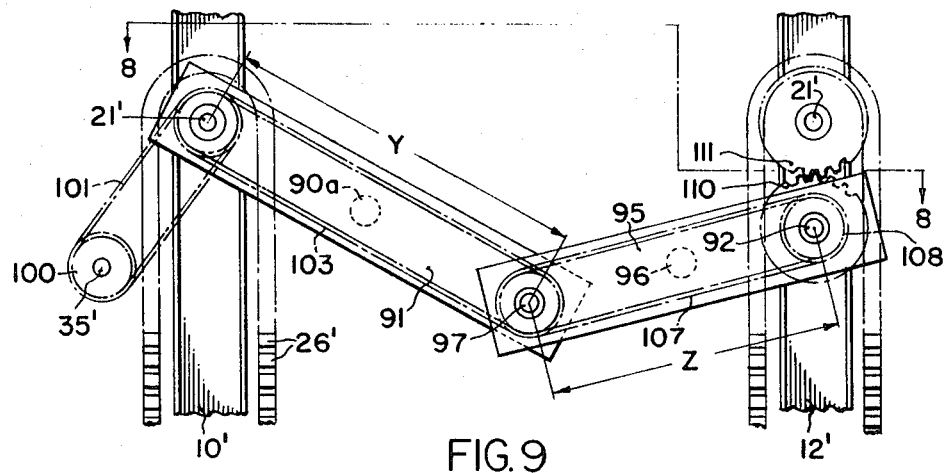
FIG. 9 is a fragmentary elevational view thereof.

The pair of right-angle power transmission units 36 and 36a for driving the endless members E may be replaced by the drive mechanism illustrated in FIGS. 8 and 9. For the sake of convenience, parts corresponding to those parts illustrated in FIGS. 1 – 3 will be designated by the same numeral, but with a prime designation. The drive mechanism shown in FIGS. 8 and 9 also insures that the opposed blocks 26' on the fixed and movable frames are always moved downwardly in unison and horizontal parallelism.

As FIG. 8 indicates, the former gear reduction unit 33' is repositioned so that its output shaft 35' is parallel to the shafts 21' on which the sprockets for endless members E' are mounted. The shaft 21' on the fixed frame 8' extends axially beyond the channel member 10' and pivotally supports one end of a frame 90, which includes a pair of side wall members 91 connected by spacer bars 90a, on bushings 91a. Similarly a shaft 92, fixed to the channel member 12' below the shaft 21' on the movable frame 9', pivotally supports a frame 94, having a pair of side wall members 95 connected by suitable crosspieces 96, on bushings 95a. The frame 90 and 94 are pivotally connected by a shaft 97 which is journaled by bushings 91b and 95b supported on the walls 91 and 95. Restraining collars 98 may be fixed on the ends of the shaft 97 to maintain the axial alignment of the parts. Also, axial movement of the frame 90 on the one shaft 21' and the frame 94 on the shaft 92 is similarly prevented by restraining collars 98' fixed to the ends of the shaft 21' and shaft 92.

A sprocket 99, keyed to the shaft 21' on the fixed frame 8', is driven by the sprocket 100 on the output shaft 35' of the gear reduction unit 33', by a chain 101, trained therearound. A second sprocket 102, also keyed to the shaft 21', drives a chain 103 which is trained around a sprocket 104 fixed to a bushing 105 that is freely rotatable on the shaft 97. A sprocket 106 is also fixed to the bushing 105 and a chain 107 is trained around sprocket 106 and a sprocket 108 which is fixed to a bushing 109 which is freely rotatable on the shaft 92. A gear 110, also fixed to the bushing 109, is in driving engagement with a gear 111 keyed to the upper shaft 21' on movable frame 9'. Suitable spacers 112 are positioned on the shafts 21', 97 and 92 to maintain the axial alignment of the parts.

The pitch diameters and the number of teeth on the sprockets 99, 102, 104, 106 and 108 are the same and the pitch diameters and the number of teeth on the gears 110 and 111 are the same. Thus, one revolution of the shaft 21' on the fixed frame 8 results in one revolution (in the opposite direction) of the shaft 21' on the movable frame 9' and the opposed blocks 26' on the endless members E' on fixed and movable frames 8' and 9' are always moved in horizontal alignment regardless of their relatively laterally spread position. When the frame 9' is moved away from the fixed frame 8', the frames 90 and 94 pivot upwardly and tend to "straighten out" so that the angle between them increases and conversely when the frame 9' is moved back the angle between them decreases. Nevertheless, with the distances Y and Z remaining constant, if no motion is imparted to sprocket 100, no motion is being imparted to gear 111.

Any two sets of opposing blocks 26' on the fixed frame 8' and movable frame 9' always remain in the same horizontal plane and a clamped panset P is always released by the two blocks 26' on the fixed frame 8' and the two opposed blocks 26' on the movable frame 9' simultaneously so that the released pan P is freed by the blocks 26' to drop straight down. The mechanism also prevents cocking of the pansets as they are clamped.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

I claim:

1. Apparatus for unstacking a generally vertical stack of pans by removing the lowermost pans successively in sequence comprising:
   first and second opposed spreadable stack gripping means relatively movable between a spaced apart stack receiving position and a more closed stack clamping position in which a stack of pans is clamped by said stack gripping means;
   means for relatively moving said opposed stack gripping means between said stack receiving and said stack clamping positions; and
   means for moving said opposed stack gripping means downwardly to lower the stack and successively release the lowermost pan when the stack gripping means is in said stack clamping position.

2. Apparatus as set forth in claim 1 including means operable to supply a stack of pans between said stack gripping means when said stack gripping means are in said stack receiving position.

3. Apparatus as set forth in claim 1 including means precluding operation of said last mentioned moving means until after said opposed means are in said stack clamping position.

4. Apparatus as set forth in claim 1 including means for denesting a released pan, which remains inadvertently nested with the superjacent pan for a predetermined time after release, to move the released pan downwardly.

5. Apparatus as set forth in claim 1 including longitudinally extending receiving conveying means for receiving said released pans, said receiving conveying means being transversely movable to a centered position with respect to said pan gripping means so that the center of gravity of the pans being conveyed always lies substantially along a vertical plane passing through the longitudinal centerline of the receiving conveying means, and means for automatically moving said conveying means to said center position when said pan gripping means are moved between stack receiving and stack clamping positions.

6. Apparatus as set forth in claim 1 wherein said opposed stack gripping means comprises opposed endless belt means having substantially parallel reaches for gripping perimetrally spaced apart portions of said stack of pans; and said means for relatively moving said stack gripping means includes means for moving said opposed endless belt means between said stack receiving and stack clamping positions while maintaining said reaches in parallel relation.

7. Apparatus as set forth in claim 6 wherein each of said opposed endless belt means comprises a plurality of interconnected spaced apart resilient blocks.

8. The combination defined in claim 6 wherein said endless belt means are respectively mounted on a fixed and movable frame; motor drive means is provided; drive shaft means connected therewith for driving said endless belt means on the fixed frame; a first drive chain support frame pivotal on said drive shaft means; a second drive chain support frame, including a drive connected to drive the endless belt means on the movable frame, pivotal on said movable frame and also pivotally connected with said first chain support frame; and spaced apart sprockets with chains trained therearound carried by each of said chain support frames in a manner such that the spaced positions of the sprockets on each chain support frame do not change regardless of the relative positions of the fixed and movable frames and the relative pivoted positions of the chain support frames, and drive motion imparted to the endless belt means on the fixed frame is equally imparted to the endless belt means on the movable frame.

9. The combination defined in claim 8 in which a drive shaft on the movable frame on which said endless belt means is mounted has a gear mounted thereon, and the drive on said second drive chain support frame includes a gear in mesh therewith.

10. The combination defined in claim 9 in which a shaft pivotally connecting said first and second drive chain support frames mounts one of said sprockets for each of said chain support frames.

11. Apparatus for unstacking a generally vertical stack of pans by removing the lowermost pans successively in sequence comprising:
    first and second vertically disposed, opposed spreadable stack gripping means relatively movable between a spaced apart stack receiving position and a more closed stack clamping position in which a stack of pans is clamped by said stack gripping means; said opposed pan gripping means comprising laterally opposed aligned gripper members for gripping perimetrally spaced apart portions of said stack of pans;
    means for relatively moving said opposed stack gripping means between said stack receiving and said stack clamping positions;
    means for moving said opposed stack gripping members downwardly to lower the stack and simultaneously release the lowermost pan, when the stack gripping means is in said stack clamping position; and
    means for preventing said opposed stack gripping members from moving out of precise lateral alignment.

12. The combination defined in claim 11 wherein said means preventing said members from moving out of precise lateral alignment includes drivingly connected, non-slippable drives mounted to drive the gripping members on each of said opposed pan gripping means downwardly in unison and parallelism.

* * * * *